(12) United States Patent
Yamamoto et al.

(10) Patent No.: US 8,047,341 B2
(45) Date of Patent: Nov. 1, 2011

(54) CYLINDER APPARATUS

(75) Inventors: Satsuki Yamamoto, Aikou-gun (JP); Yusuke Maegawa, Berea (JP); Tetsuo Yoshida, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 604 days.

(21) Appl. No.: 12/219,425

(22) Filed: Jul. 22, 2008

(65) Prior Publication Data
US 2009/0032345 A1 Feb. 5, 2009

(30) Foreign Application Priority Data

Jul. 31, 2007 (JP) ................................. 2007-199658

(51) Int. Cl.
*F16F 9/32* (2006.01)
(52) U.S. Cl. ..................... 188/300; 188/322.19; 267/220
(58) Field of Classification Search .................. 188/300, 188/322.19, 322.12, 314; 267/64.11, 64.12–64.14, 267/220
See application file for complete search history.

(56) References Cited

U.S. PATENT DOCUMENTS

| 3,938,793 A | * | 2/1976 | Kaptanis et al. | ............. | 267/120 |
| 4,427,188 A | * | 1/1984 | Shimokura et al. | ......... | 267/64.12 |

FOREIGN PATENT DOCUMENTS

| JP | 37-4217 | 3/1962 |
| JP | 40-13952 | 5/1965 |
| JP | 58-12744 | 7/1981 |
| JP | 58-020740 | 2/1983 |
| JP | 2-132147 | 11/1990 |
| JP | 2004-124994 | 4/2004 |

OTHER PUBLICATIONS

European Search Report issued Sep. 3, 2009 in corresponding European Patent Application No. 08 01 2734.
Chinese Office Action issued Mar. 3, 2011 in corresponding Chinese Patent Application No. 200810144884.2.
Japanese Office Action (with partial English translation) mailed Jun. 15, 2011 in corresponding Japanese Patent Application No. 2007-199658.

* cited by examiner

*Primary Examiner* — Pamela Rodriguez
(74) *Attorney, Agent, or Firm* — Wenderoth, Lind & Ponack, L.L.P.

(57) ABSTRACT

A hydraulic shock absorber enables its piston rod to be locked near its minimum length position and allows the locked condition to be visually confirmed easily. A cap member is secured to a distal end portion of a piston rod extending from a cylinder part, and a dust cover is secured to the cap member. A lock member is secured to an end of the cylinder part from which the piston rod extends to the outside. The lock member is cut and bent upward to form engaging portions. The cap member is cut and bent downward to form engaging pieces and windows. With the piston rod contracted to near its minimum length position, the cap member is rotated to engage the engaging portions and the engaging pieces with each other, thereby locking the piston rod. The engaged condition of the engaging portions and the engaging pieces can be visually confirmed through the windows.

12 Claims, 6 Drawing Sheets

CYLINDER APPARATUS

BACKGROUND OF THE INVENTION

The present invention relates to cylinder apparatus such as a hydraulic shock absorber, a gas spring, etc. in which a rod extends from one end of a cylinder part.

In cylinder-type hydraulic shock absorbers attached to suspension systems of automobiles, for example, it is desirable to lock the piston rod near its minimum length position during transport and storage in view of the space efficiency and from the viewpoint of protecting the surface of the piston rod from rusting and being contaminated. However, in a hydraulic shock absorber having a gas sealed in the cylinder to pressurize the hydraulic fluid in the cylinder at all times in order to prevent cavitation or the like, the piston rod is, generally, extended by the gas pressure.

Conventionally, the piston rod is restrained in its minimum length position by using a synthetic resin band or a metallic wire. Alternatively, as disclosed, for example, in Japanese Utility Model Registration Application Publication No. Hei-2-132147, mutually engageable engaging members are attached to the hydraulic shock absorber body and the distal end of the piston rod, and these engaging members are engaged with each other to thereby lock the piston rod in its minimum length position.

However, the above-described conventional method using a synthetic resin band or a metallic wire involves the problem that it takes time and effort to cut the band or to untie the wire at the time of attaching the hydraulic shock absorber to a vehicle or the like. In addition, the conventional method needs time and effort to dispose of or recycle the used band or wire.

In the hydraulic shock absorber equipped with engaging members as disclosed in the above-mentioned Japanese Utility Model Registration Application Publication No. Hei-2-132147, the engaged condition of the engaging members cannot be visually confirmed for the reason, for example, that the piston rod is covered with a dust cover. It is conceivable to provide a window in the dust cover to allow visual inspection of the engaged condition. In such a case, however, visibility is not good because the engaged part is viewed through the window. Therefore, the provision of a window in the dust cover cannot be said to be a satisfactory solution.

SUMMARY OF THE INVENTION

The present invention has been made in view of the above-described circumstances. Accordingly, an object of the present invention is to provide a cylinder apparatus that enables the rod to be locked near its minimum length position without using either a band or a wire and that allows the locked condition to be visually confirmed easily.

The present invention provides a cylinder apparatus including a cylinder part, a rod extending from one end of the cylinder part, and a lock mechanism capable of locking the rod near its minimum length position. The lock mechanism includes a lock member secured to the one end of the cylinder part and having a first engaging portion. The lock mechanism further includes a cap member secured to a distal end portion of the rod to face the lock member. The cap member has a second engaging portion provided by forming a hole in the cap member. Relative rotation between the lock member and the cap member causes the first engaging portion of the lock member to engage with the second engaging portion of the cap member at a side of the second engaging portion closer to the distal end of the rod, thereby locking the rod.

DETAILED DESCRIPTION OF THE PREFERRED EMBODIMENTS

One embodiment of the present invention will be described below in detail with reference to the accompanying drawings.

Figure 1:
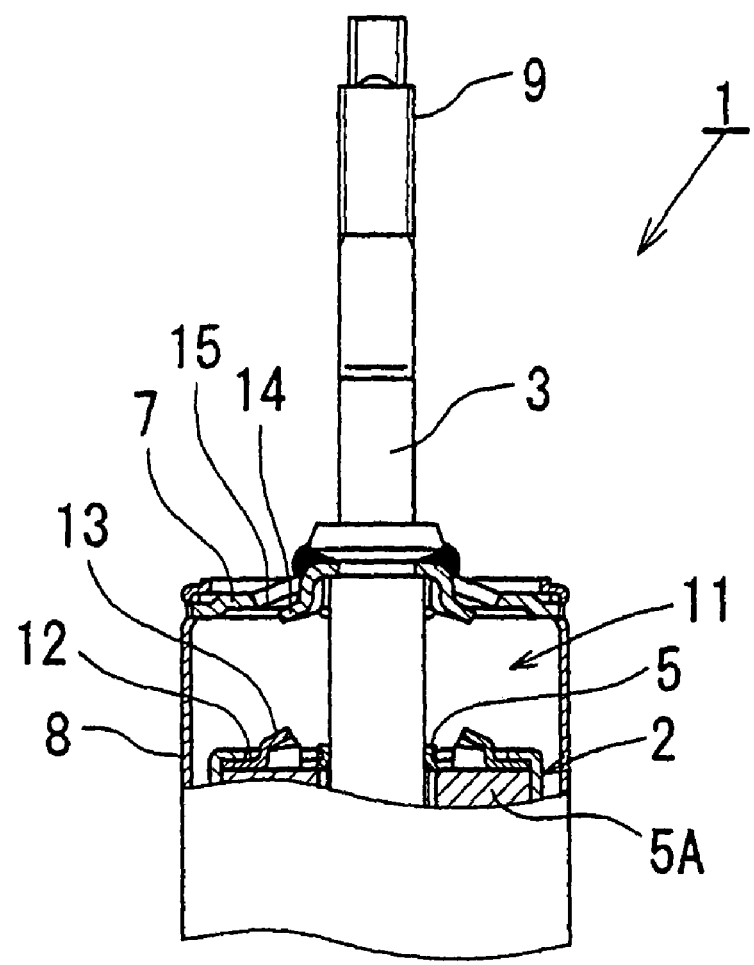
FIG. 1 is a partly-cutaway side view of a main part of a hydraulic shock absorber according to a first embodiment of the present invention.
Figure 2:
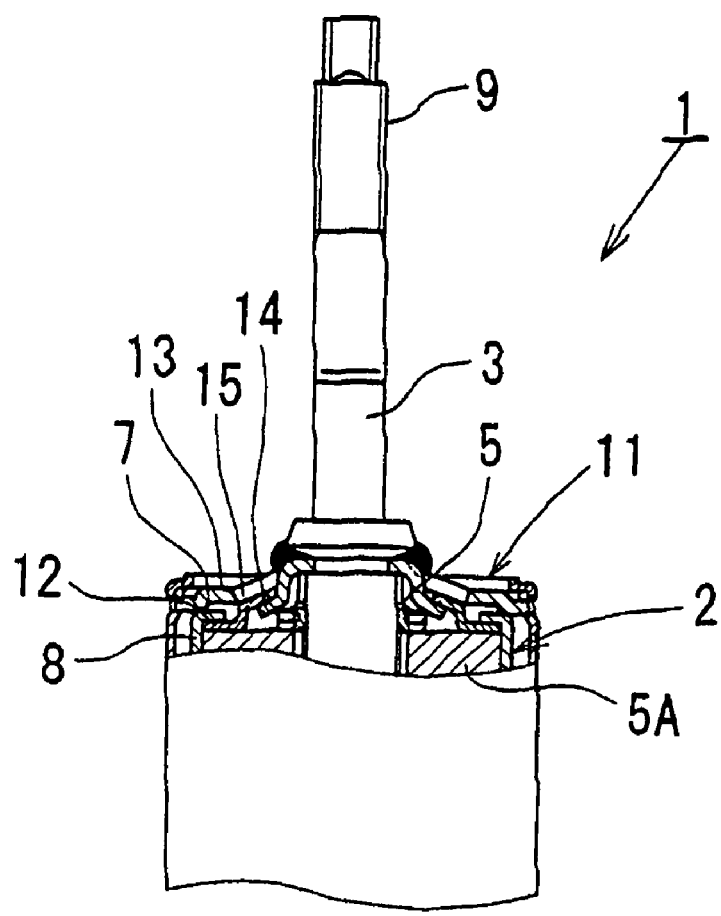
FIG. 2 is a partly-cutaway side view of the hydraulic shock absorber in FIG. 1, showing a state where a piston rod has been locked.
Figure 3:
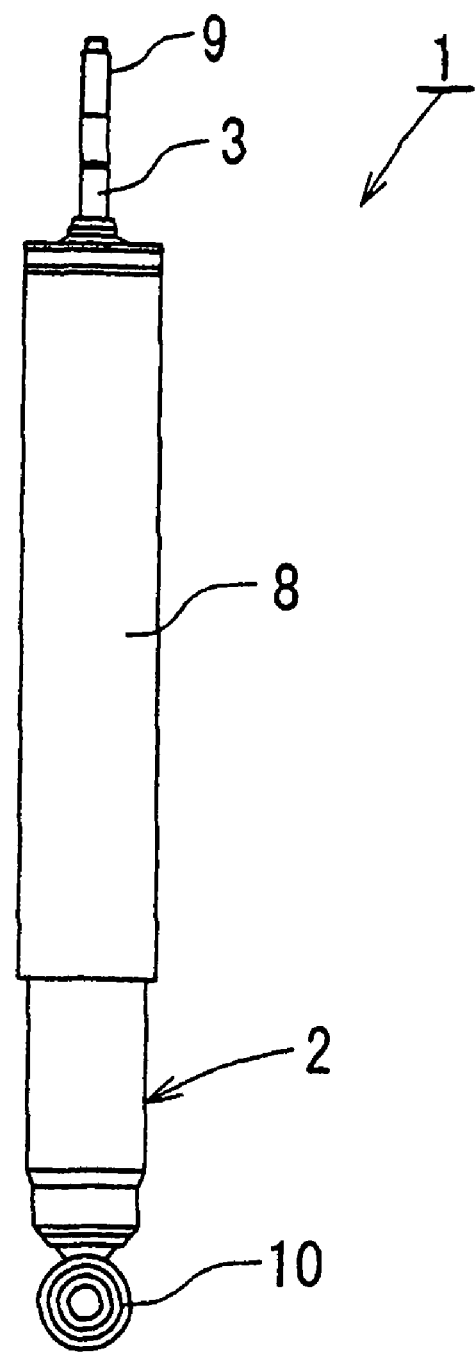
FIG. 3 is a side view of the hydraulic shock absorber shown in FIG. 1.

As shown in FIGS. 1 to 3, a hydraulic shock absorber 1 (cylinder apparatus) according to this embodiment is a cylinder-type hydraulic shock absorber in which a piston (not shown) is slidably fitted in a cylinder (see reference numeral 2A in FIG. 7, which will be explained later) of a cylinder part 2 having a hydraulic fluid (not shown) sealed therein. The piston is connected with one end of a piston rod 3 (rod). The other end of the piston rod 3 extends to the outside of the cylinder part 2 through a rod guide (see reference numeral 4 in FIG. 7) and an oil seal 5, which are fitted to an upper end portion of the cylinder part 2.

The hydraulic shock absorber 1 is provided with hydraulic fluid passages (not shown) in which a flow of hydraulic fluid is induced by the sliding movement of the piston in the cylinder 2A. The hydraulic shock absorber 1 is further provided with a damping force generating mechanism (not shown) comprising orifices and disk valves, which generates a damping force by controlling the flow of hydraulic fluid in the hydraulic fluid passages. The cylinder part 2 is provided with a reservoir (see reference numeral 6 in FIG. 7) having a high-pressure gas sealed therein to compensate for a volumetric change in the cylinder 2A due to extension and contraction of the piston rod 3 by the compression and expansion of the gas in the reservoir 6. Alternatively, the arrangement may be as follows. A free piston (not shown) is slidably fitted in the bottom of the cylinder 2A to form a gas chamber (not shown), and a high-pressure gas is sealed in the gas chamber to compensate for a volumetric change in the cylinder 2A.

A substantially disk-shaped cap member 7 is secured by welding or the like to a distal end portion of the piston rod 3. The upper end of a cylindrical dust cover 8 is fitted and secured to the outer peripheral portion of the cap member 7. The dust cover 8 is slightly larger in diameter than the cylinder part 2 to cover the cylinder part 2 and the piston rod 3. The dust cover 8 extends to a length sufficient for the lower end of the dust cover 8 to reach the upper end of the cylinder part 2 when the piston rod 3 extends to its maximum length position.

The piston rod 3 has a mounting portion 9 formed at the distal end thereof. The mounting portion 9 comprises a threaded portion, for example, for connection to a suspension member provided on the vehicle body side. A mounting eye 10 is secured to the bottom of the cylinder part 2 to connect to a suspension member, e.g. a suspension arm.

The hydraulic shock absorber 1 is provided with a lock mechanism 11 to lock the piston rod 3 to its minimum length position. The lock mechanism 11, which is a main part of the present invention, will be explained below.

Figure 4:
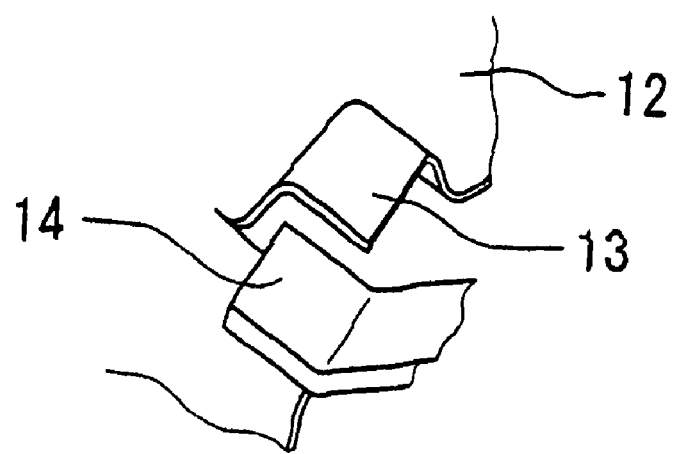
FIG. 4 is an enlarged perspective view of a lock mechanism of the hydraulic shock absorber shown in FIG. 1.

A substantially ring-shaped (disk-shaped) lock member 12 is secured to the upper end of the cylinder part 2, from which the piston rod 3 extends to the outside. The lock member 12 is fitted in the cylinder part 2 in the state of being superimposed on a retainer 5A of the oil seal 5. In this state, the upper end of the cylinder part 2 is caulked inward to secure the lock member 12 to the upper end of the cylinder part 2, together with the rod guide 4 and the oil seal 5. As shown in FIG. 4, the lock member 12 is cut and bent upward at two diametrically opposing positions of the inner periphery thereof to form substantially rectangular engaging portions 13 (first engaging portions), each of which is open at the inner periphery and at one circumferential end thereof.

The cap member 7, which is secured to the piston rod 3, is cut and bent downward at two diametrically opposing positions thereof closer to the inner periphery thereof that face the engaging portions 13 of the lock member 12 to form substantially rectangular engaging pieces 14 (second engaging portions) that extend diametrically from the outer periphery of the piston rod 3. The cap member 7 has windows 15 (openings) formed as the result of cutting and bending downward the engaging pieces 14. The windows 15 have the same configuration as that of the engaging pieces 14. The engaging pieces 14 are engaged with the respective lower sides of the engaging portions 13 of the lock member 12 through the openings of the engaging portions 13 by rotating the cap member 7 in a state where the piston rod 3 has been contracted substantially to its minimum length position. In other words, the engaging portions 13 engage with the respective upper sides of the engaging pieces 14 (i.e. the respective sides thereof closer to the distal end of the piston rod 3). Thus, the piston rod 3 can be locked in its minimum length position. In this embodiment, the cap member 7 is secured to the piston rod 3 by welding and hence rotate together with the piston rod 3 (i.e. the piston). The cap member 7, however, may be fitted rotatably relative to the piston rod 3.

The following is an explanation of the operation of this embodiment arranged as stated above.

The sliding movement of the piston caused by the extension and contraction of the piston rod 3 induces a flow of hydraulic fluid in the hydraulic fluid passages in the cylinder part 2. The flow of hydraulic fluid is controlled by the damping force generating mechanism comprising orifices and disk valves to generate a damping force. At this time, a volumetric change in the cylinder 2A due to the entry and withdrawal of the piston rod 3 is compensated for by the compression and expansion of the gas in the reservoir 6 or the gas chamber.

The piston rod 3 is constantly subjected to a force in the direction of extension by the pressure of gas in the reservoir 4 or the gas chamber. When the piston rod 3 is to be locked in its minimum length position to store or transport the hydraulic shock absorber 1, as shown in FIGS. 1 and 2, the piston rod 3 is contracted to near its minimum length position against the pressure of gas in the reservoir 4 or the gas chamber. In this state, the cap member 7 is rotated to engage the engaging pieces 14 of the cap member 7, which is secured to the piston rod 3, with the engaging portions 13 of the lock member 12, which is secured to the cylinder part 2. Thus, the piston rod 3 can be locked in its minimum length position.

To unlock the piston rod 3, it is rotated in the direction opposite to the direction for locking to disengage the engaging pieces 14 from the engaging portions 13. In this way, the piston rod 3 can be unlocked. It should be noted that if the piston rod 3 is rotated while pressing it in the direction of contraction, the engaging pieces 14 can be smoothly disengaged from the engaging portions 13.

In this regard, because the engaging portions 13 engage with the respective upper sides of the engaging pieces 14, the engaged condition of the engaging portions 13 and the engaging pieces 14 can be visually confirmed easily through the windows 15 of the cap member 7. Thus, locking and unlocking of the piston rod 3 can be performed easily.

In addition, because the engaging portions 13 and the engaging pieces 14 are formed by cutting and bending the disk-shaped lock member 12 and cap member 7, respectively, the axial length thereof can be made sufficiently small. Therefore, the engaging portions 13 and the engaging pieces 14 exert substantially no influence on the stroke of the piston rod 3.

Next, modifications of the above-described embodiment will be explained with reference to FIGS. 5 and 6. It should be noted that, in the following modifications, members or portions similar to those in the foregoing embodiment are denoted by the same reference numerals as used in the embodiment, and only portions in which the modifications differ from the embodiment will be explained in detail.

Figure 5:
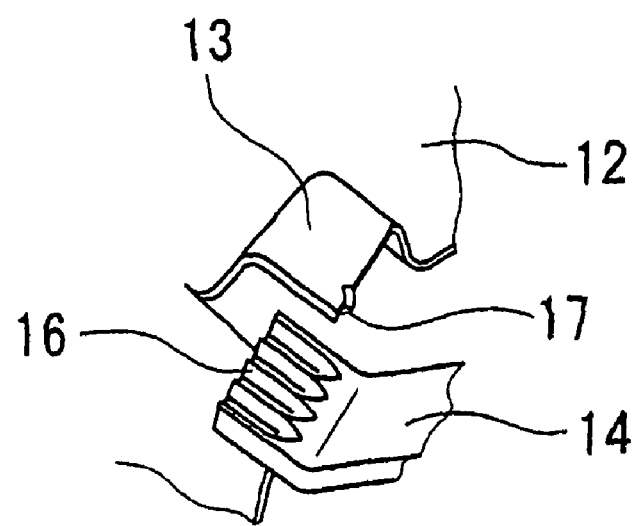
FIG. 5 is an enlarged perspective view of a modification of the lock mechanism of the hydraulic shock absorber shown in FIG. 1.

In the modification shown in FIG. 5, each engaging piece 14 has a plurality of tooth grooves 16 formed on an engaging surface thereof. Each engaging portion 13 has projections 17 projecting to face the tooth grooves 16. Meshing between the tooth grooves 16 and the projections 17 can firmly maintain the engaged condition of the engaging portions 13 and the engaging pieces 14. With this structure, it is possible to prevent the piston rod 3 from being accidentally unlocked. To unlock the piston rod 3, it is pressed in the direction of contraction to cancel the meshing between the tooth grooves 16 and the projections 17. Thus, the engaging portions 13 and the engaging pieces 14 can be disengaged from each other.

Figure 6:
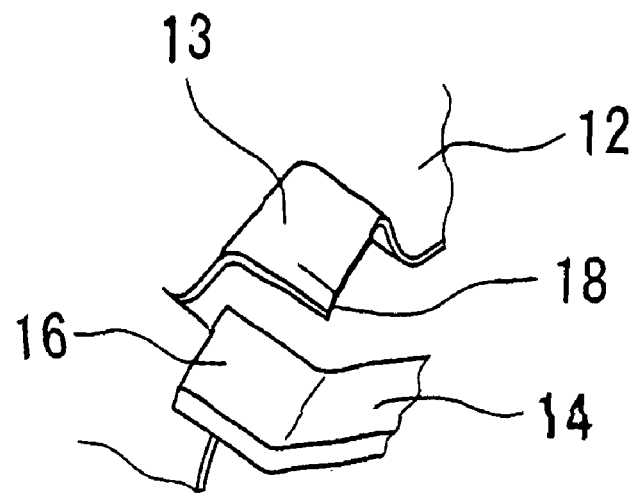
FIG. 6 is an enlarged perspective view of another modification of the lock mechanism of the hydraulic shock absorber shown in FIG. 1.

In the modification shown in FIG. 6, a distal end portion of each engaging portion 13 at the side thereof closer to the circumferential opening is bent inwardly to project inwardly, thereby forming a retaining projection 18. When the engaging piece 14 is engaged with the engaging portion 13, the engaged condition can be firmly maintained by the retaining projection 18. With this structure, it is possible to prevent the piston rod 3 from being accidentally unlocked. To unlock the piston rod 3, it is pressed in the direction of contraction to separate the engaging piece 14 from the retaining projection 18. Thus, the engaging portion 13 and the engaging piece 14 can be disengaged from each other.

Next, a second embodiment of the present invention will be explained with reference to FIGS. 7 to 8. It should be noted that, in the second embodiment, members or portions similar to those in the foregoing first embodiment are denoted by the same reference numerals as used in the first embodiment, and only portions in which the second embodiment differs from the first embodiment will be explained in detail.

Figure 7:
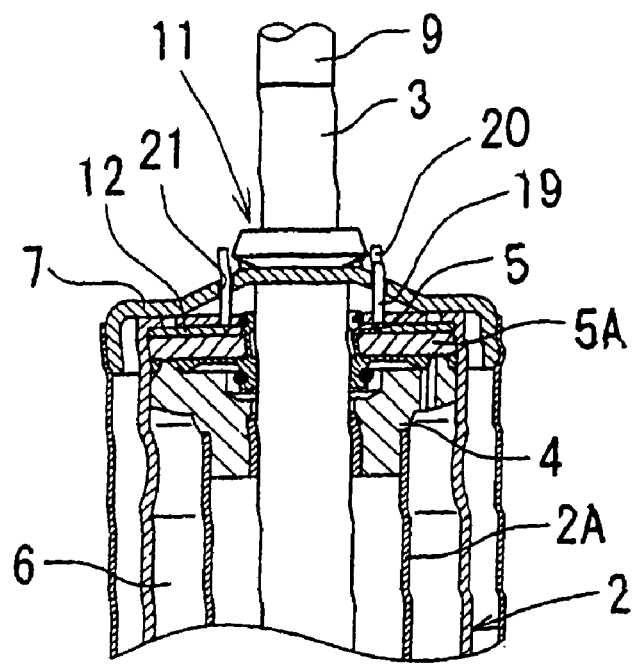
FIG. 7 is a fragmentary vertical sectional view of a main part of a hydraulic shock absorber according to a second embodiment of the present invention.
Figure 8:
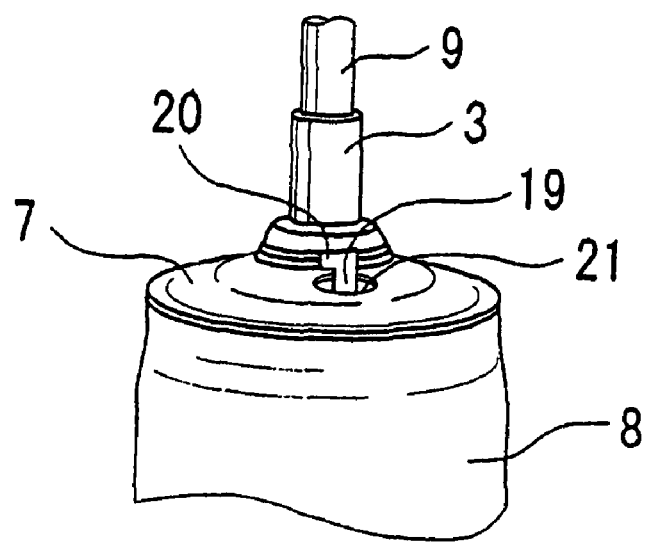
FIG. 8 is a perspective view of a main part of the hydraulic shock absorber shown in FIG. 7.
Figure 9:
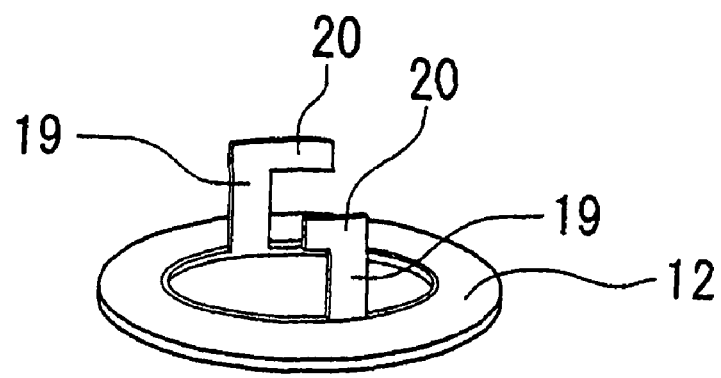
FIG. 9 is a perspective view of a lock member of the hydraulic shock absorber shown in FIG. 7.

As shown in FIGS. 7 to 9, the lock member 12 in this embodiment has a pair of upwardly bent engaging portions 19 (first engaging portions) at two diametrically opposing positions of the inner periphery thereof. The respective distal ends of the pair of engaging portions 19 are bent in mutually opposite directions to form hook-shaped (L-shaped) latch portions 20. The cap member 7 has a pair of engaging holes 21 (second engaging portions) opened to face the pair of engaging portions 19 of the lock member 12. The engaging holes 21 allow the engaging portions 19 to be inserted therethrough. With the piston rod 3 contracted substantially to its minimum length position, the engaging portions 19 are inserted through the engaging holes 21. In this state, the cap member 7 is rotated to engage the latch portions 20 at the distal ends of the engaging portions 19 with the respective edges of the engaging holes 21. Thus, the piston rod 3 can be locked in its minimum length position.

To unlock the piston rod 3, it is rotated in the direction opposite to the direction for locking to disengage the latch portions 20 of the engaging portions 19 from the edges of the engaging holes 21. In this way, the piston rod 3 can be unlocked. It should be noted that if the piston rod 3 is rotated while pressing it in the direction of contraction, the latch portions 20 can be smoothly disengaged from the edges of the engaging holes 21.

In this regard, because the engaging portions 19 engage with the respective edges of the engaging holes 21 at the outer sides thereof (i.e. at the sides thereof closer to the distal end of the piston rod 3), the engaged condition can be visually confirmed easily. Thus, locking and unlocking of the piston rod 3 can be performed easily and reliably.

Although in the foregoing first and second embodiments the present invention is applied to a hydraulic shock absorber, it should be noted that the present invention is similarly applicable to other cylinder apparatus such as a hydraulic cylinder, a gas spring, etc. in which a rod extends from a cylinder part.

According to the cylinder apparatus of the present invention, the rod can be locked in its minimum length position by a lock mechanism provided on the cylinder part and the cap member, without using either a band or a wire. Further, the locked condition can be visually confirmed easily because the first engaging portions of the lock member of the cylinder part engage with the second engaging portions of the cap member at the respective sides of the second engaging portions closer to the distal end of the rod.

What is claimed is:

1. A cylinder apparatus adapted to be mounted on a vehicle, the cylinder apparatus comprising:
    a cylinder part;
    a rod extending from one end of said cylinder part and having a mounting portion formed at a distal end of said rod for connection to a body of the vehicle; and
    a lock mechanism capable of locking said rod near its minimum length position;
    said lock mechanism including:
        a lock member secured to the one end of said cylinder part from which said rod extends to the outside by the one end of said cylinder part being caulked inward, the lock member having a first engaging portion bent from said lock member; and
        a cap member secured to the distal end portion of said rod to face said lock member, said cap member having a second engaging portion provided by a hole formed in said cap member;
    wherein relative rotation between said lock member and said cap member causes said first engaging portion of said lock member to engage with said second engaging portion of said cap member at a side of said second engaging portion closer to the distal end of said rod, thereby locking said rod.

2. The cylinder apparatus of claim 1, wherein said lock member and said cap member are plate-shaped and said second engaging portion is bent from said cap member.

3. The cylinder apparatus of claim 2, wherein said cap member has a cylindrical dust cover secured thereto to cover said rod.

4. The cylinder apparatus of claim 3, which is a hydraulic shock absorber in which said cylinder part has a hydraulic fluid and a gas sealed therein.

5. The cylinder apparatus of claim 2, which is a hydraulic shock absorber in which said cylinder part has a hydraulic fluid and a gas sealed therein.

6. The cylinder apparatus of claim 1, wherein said second engaging portion is an engaging hole extending through said cap member;
    said first engaging portion being insertable through said engaging hole and engageable with an edge of said engaging hole to lock said rod.

7. The cylinder apparatus of claim 6, wherein said cap member has a cylindrical dust cover secured thereto to cover said rod.

8. The cylinder apparatus of claim 7, which is a hydraulic shock absorber in which said cylinder part has a hydraulic fluid and a gas sealed therein.

9. The cylinder apparatus of claim 6, which is a hydraulic shock absorber in which said cylinder part has a hydraulic fluid and a gas sealed therein.

10. The cylinder apparatus of claim 1, wherein said cap member has a cylindrical dust cover secured thereto to cover said rod.

11. The cylinder apparatus of claim 10, which is a hydraulic shock absorber in which said cylinder part has a hydraulic fluid and a gas sealed therein.

12. The cylinder apparatus of claim 1, which is a hydraulic shock absorber in which said cylinder part has a hydraulic fluid and a gas sealed therein.

* * * * *